Figure 1:
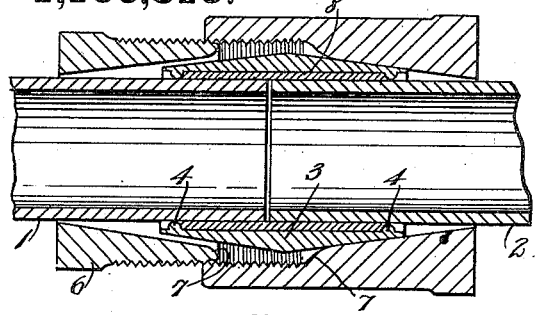

J. W. McFERRAN.
PIPE COUPLING.
APPLICATION FILED SEPT. 12, 1913.

1,186,813.

Patented June 13, 1916.

WITNESSES
R. L. Bruck
H. B. McGill

INVENTOR,
John W. McFerran
By Hull & Smith
ATTYS.

UNITED STATES PATENT OFFICE.

JOHN W. McFERRAN, OF CLEVELAND, OHIO.

PIPE-COUPLING.

1,186,813.  Specification of Letters Patent. Patented June 13, 1916.

Application filed September 12, 1913. Serial No. 789,573.

*To all whom it may concern:*

Be it known that I, JOHN W. McFERRAN, a citizen of the United States, residing at Cleveland, in the county of Cuyahoga and State of Ohio, have invented a certain new and useful Improvement in Pipe-Couplings, of which the following is a full, clear, and exact description, reference being had to the accompanying drawings.

This invention relates to pipe couplings and has for its object the provision of a coupling for connecting a pipe or rod to any desired fitting, or to connect two such sections of pipe or rod together, and this without the use of solder or of soft packing, such as rubber, and without the necessity of threading, flanging, grooving, indenting or otherwise operating the pipes or rods, and without reference as to whether the pipes or rods be of soft metal or of hard metal or whether they be externally smooth or provided with scratches, seams, corrugations, threads, grooves, or indentations.

Other objects are the provision of a pipe coupling of the greatest simplicity and cheapness; the provision of a coupling which can be assembled with a minimum of time and exertion and with the employment of the smallest possible number of tools; while further objects and advantages of the invention will become apparent in the course of the following description and claims.

In my earlier copending application, filed Feb. 23, 1912, Ser. No. 679,393, I have described and claimed a novel and highly efficient form of pipe joint which experience shows to be of very great advantage in connection with pipes of small diameter. In the device disclosed in this prior application the end of the pipe or rod to be connected is surrounded with an interiorly smooth sleeve which is formed upon the exterior with a circumferential rib, said rib being afterward transferred by pressure to the interior of the sleeve so as to form an internal bead therein denting the pipe or rod and interlocking therewith. However, it is found that the width of the internal bead is much greater than that of the original external rib owing to the spreading and diffusion of the inward stress throughout the walls of the sleeve. This diffusion reduces the pressure upon the bead so as to prevent the desired denting of the pipe or rod unless the latter be of very soft metal or have comparatively thin walls or be of comparatively small diameter. By the use of the devices and expedients disclosed in this application, I am enabled to extend the use of my improvements to pipes of harder metal and of greater thickness and of larger diameter.

Generally speaking, my invention may be defined as consisting of the combinations and constructions recited in the claims hereto annexed and illustrated in the drawings accompanying and forming a part hereof, although it will be understood that the embodiments illustrated in the drawings comprise but a very few of a great number of forms in which my invention can be embodied.

Figure 2:
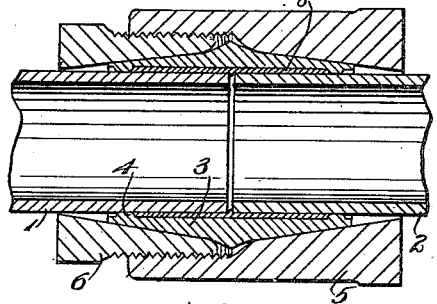
Figure 3:
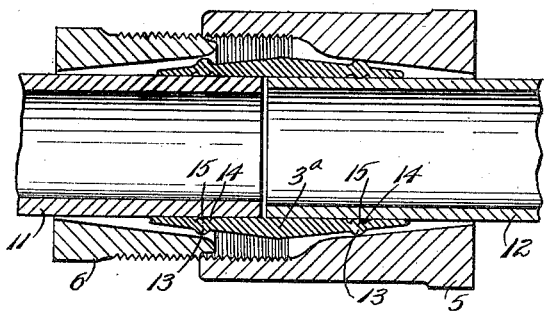
Figure 4:
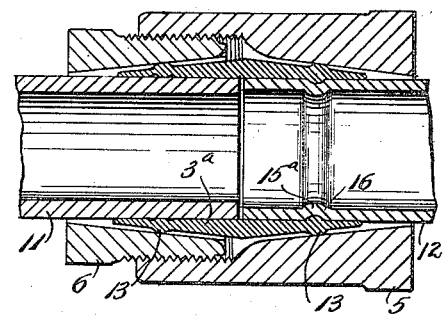
Figure 5:
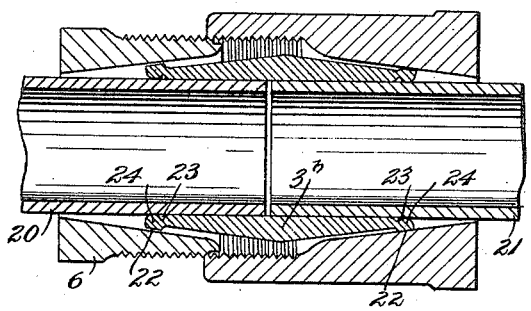
Figure 7:
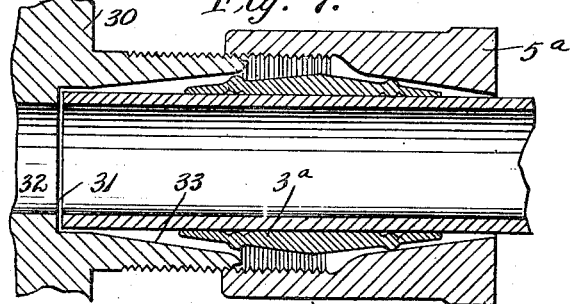
Figure 8:
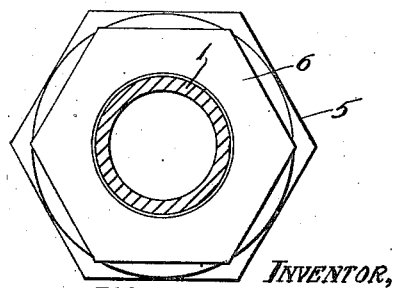

In these drawings, Figure 1 is a longitudinal cross sectional view through a pair of abutting hard metal pipes with the parts of my improved pipe coupling thereon, such parts being shown prior to setting up. Fig. 2 shows the same parts set up. Fig. 3 is a longitudinal cross sectional view of the abutting ends of hard and soft metal pipes with the parts of a modified coupling thereon, said parts being shown prior to setting up; Fig. 4 shows those parts set up. Fig. 5 is a longitudinal cross sectional view through the abutting ends of a pair of soft metal pipes the same being surrounded by the parts of my improved coupling constructed according to another modification; and Fig. 6 shows the same parts set up— Fig. 7 is a longitudinal cross sectional view showing one mode of applying my improved connection to the joint between a soft metal pipe and a fitting, the parts being shown prior to setting up; and Fig. 8 is a transverse cross sectional view.

Describing the parts by reference characters, particular attention being had to Figs. 1 and 2, 1 and 2 represent the pipes to be secured together, the same being shown in this instance as of hard metal, such as cast or wrought iron or steel, and of substantially equal external size. Surrounding and bridging the meeting ends of these pipes is a doubly tapered sleeve 3 of rather hard, ductile, and malleable metal, preferably an alloy of brass and bronze, although either brass or bronze may be used, or in fact any metal which shall possess the properties hereinafter described. Interiorly the sleeve is provided adjacent to each end with a circumferential bead 4, the internal diameter of the same being preferably just such as to receive the ends of the pipes 1 and 2. Upon the ends of the sleeve 3 are mounted a pair of constricting members, here comprising a pair of threaded members 5 and 6 respectively, having their interiors tapered complementarily to the tapered surfaces of the sleeve 3 and adapted when brought together to produce a powerful inward pressure upon the same. When screw threaded members are employed as illustrated the larger ends of their tapered inner portions are preferably gradually enlarged as at 7, so that no sharp or abrupt shoulders may be provided which shall tend to impede the movement of the same over the sleeve 3. When the parts are tightened up as illustrated in Fig. 2, the diameter of the ends of the sleeve 3 is decreased, and the beads 4—4 are forced against the surfaces of the pipes 1 and 2 with a very severe pressure, owing to the fact that the whole force of the constriction of the sleeve is expended upon the comparatively small area presented thereby. This force is so great as to cause indentations to be made in all but the hardest and thickest pipes, and even where an indentation be not made owing to the hardness of the pipe, the pressure is so great as to force the faces of these beads intimately into every groove, striation and irregularity of the pipe surface, thus absolutely preventing leakage and rendering endwise separation substantially impossible. If desired, and particularly in a case where the hardness of the pipes preclude the indentation of the same I may line the interior of the sleeve between the beads 4—4 with a layer 8 of a softer material such as lead, which, upon the constriction of the sleeve, will be caused to flow into all of the striations, grooves, or indentations of the metal and thus reinforce the joint against leakage. Another advantage of this liner is that it precludes any relative angular movement of the pipes, and thus prevents their working about so as to form a leak past the beads 4—4. While lead has been suggested as the preferable material for this liner, other soft materials, such as even rubber can be employed, if desired. It is desirable to employ some material for liners of less hardness than the sleeve itself, since the more solid sleeve serves to confine and embrace this liner, while the beads 4—4 prevent its being exuded through the ends of the sleeves.

In Figs. 3 and 4, I have illustrated a modified form of coupling, particularly desirable for use in connection with lighter work or with tubes which will more easily admit of indentation or in a location where the pressure may be expected to be less. In this embodiment, the pipe ends are shown at 11 and 12, respectively, the pipe 11 being here shown as of hard metal, and the pipe 12 of soft metal so as to illustrate the possibility of employing my improved joint in connection with pipes of different types, although either or both pipes may be made of hard or soft metal if desired. The sleeve is illustrated at $3^a$ and is formed as before with a doubly tapered exterior, excepting that the exterior portion is formed adjacent to each end with an external circumferential rib 13. The interior of the sleeve is substantially cylindrical and of a size preferably such as to receive rather snugly the abutting ends of the pipes, the interior of the sleeve being formed at each end with a pair of spaced circumferential grooves 14—14, defining beads 15 which lie opposite the ribs 13. Exteriorly the sleeve is surrounded by the constricting members, as before, which may take the form of the sleeves 5 and 6 as indicated or any other desirable construction. When these members are drawn together as illustrated in Fig. 4, the ribs 13—13 are pressed radially inward so as to bring pressure upon the beads 15—15 opposite thereto. If the pipe or member within be of such hardness as not to yield to the strain, the metal of these beads is pressed intimately into contact therewith so as to render the same leak-proof; if it be softer or more yieldable, it may be corrugated as illustrated at 16 in Fig. 4, the bead $15^a$ being displaced inwardly from the surface of the sleeve so as to interlock therewith. The advantage of forming the interior of the sleeve with the grooves 14—14 is that the coming bead is more exactly defined and the force giving rise thereto is localized within a small area, thus creating a higher pressure and producing a more intimate contact between the sleeve and pipe. Also this sleeve is less expensive to make than that shown in Figs. 1 and 2, because of the fact that the grooves 14 and 14 are easier to form than the beads 4—4, of a smaller quantity of metal. The close contact of the interior of the sleeve $3^a$ with the exteriors of the pipes renders impossible the occurrence of any tilting or shifting of the joint.

Figure 6:
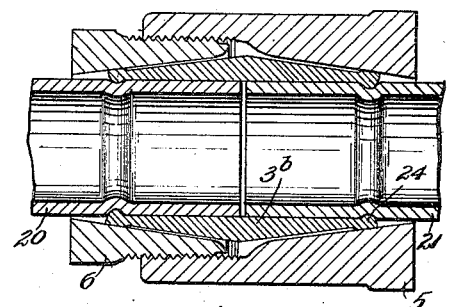

In Figs. 5 and 6, I have illustrated a third embodiment of the invention, the same being a slight variation of that shown in Figs. 3 and 4. In this view the pipes are indicated at 20 and 21 respectively, and are both shown as of soft metal although it will be understood that either or both of the same could be made of hard metal if desired. The sleeve $3^b$ surrounding the ends thereof is likewise of ductile and malleable metal of as great hardness as is compatible with its constriction by the constricting members, and is formed with a doubly tapering exterior as in the foregoing instances. Surrounding the sleeve at each extremity is an external circumferential lip or flange 22, corresponding to the bead 13—13 of the previous modification, but differing therefrom in being at the end of the sleeve instead of spaced from such end. The sleeve is interiorly cylindrical and of a size snugly to receive the abutting pipe ends, and adjacent to each end thereof is formed an internal circumferential groove 23 defining a bead 24 opposite the lip 22. This bead is exactly like the bead 15 in the former instance, excepting that it is defined by a single groove instead of by two grooves, and, like the former bead, is designed to be pressed inwardly with great force when the external lips 22—22 are reduced by radially applied pressure as by tightening up the members 5 and 6.

In case it be desired to secure a pipe to a fitting the arrangement of parts illustrated in Fig. 7 may be employed. The fitting is indicated at 30 and is provided with a pipe receiving recess 31 communicating with a bore 32. The outer end of the recess 31 is flared as at 33 for the reception of one end of the sleeve 3ª, the latter end of the same being surrounded by a companion clamp member 6ª, which is drawn toward the fitting in any suitable manner as by the union nut 35. With this arrangement the same sleeve is employed for a single pipe as for securing together a pair of pipes, thus decreasing the number of parts necessarily kept in stock, the outer end of the same serving to secure the member 6ª to the pipe in gripping relation, and the inner end serving to effect a tight joint between the pipe and fitting. Obviously any form of gripping or constricting members could be employed in this or any of the embodiments herewith illustrated.

Reference has been made to the formation of the sleeve from brass or bronze or a mixture of the two. Any metal can be used if it be sufficiently malleable to yield to the constricting action of the members 5 and 6 and at the same time sufficiently hard so that the beads may not crush too easily. The alloys mentioned possess these features in very satisfactory degree but other metals such as soft steel may be used in some cases.

I have here illustrated my coupling in connection with gas or plumbing pipes of the ordinary size. However I apprehend that it will find large use in connection with gas, water, and oil mains of very great size, the particular construction of the constricting members being varied with the size as past experience, present knowledge, future experience, or immediate necessity may indicate.

By illustrating certain forms of sleeves and constricting member in connection with hard metal pipes and others in connection with soft metal pipes, or with combinations of the two, I do not intend to restrict myself to those particular relations, shapes or uses, since these views are purely illustrative, although the constructions illustrated in Figs. 1 and 2 are particularly rugged and able to withstand heavy duty such as is more frequently encountered in connection with rigid and unyielding pipes, while that shown in Figs. 5 and 6 is somewhat the least expensive and therefore more likely to be employed in combination with lighter and cheaper constructions. Also I do not allege any particular virtue in the employment of the threaded constricting members here recited as above flanged or other types, excepting that I do know that these constricting members will operate successfully. However, any suitable or convenient construction may be used, as will be obvious.

While I have described my invention in detail, I do not, therefore, propose to be limited to such details except as the same may be positively included in the claims hereto annexed or may be rendered necessary by the prior state of the art.

Having thus described my invention, what I claim is:—

1. In a coupling for cylindrical metal members, the combination of a sleeve of hard ductile metal having a tapered exterior and a cylindrical interior, said interior being formed at a point adjacent to but spaced inwardly from its thin end with a narrow internal integral bead adapted to receive the coupled member, and a constricting member adapted to be moved longitudinally over said sleeve and to engage the portion immediately surrounding said bead, whereby said sleeve will be constricted and the bead will be pressed forcibly against the surface of the member therewithin.

2. In a coupling for cylindrical metal members, the combination of a sleeve of hard ductile metal having a doubly tapered exterior and a cylindrical interior, said interior being formed at a point adjacent to but spaced inwardly from each end an internal integral bead adapted to receive the coupled member, and constricting members formed with inclined interior recesses and adapted to be moved longitudinally of said sleeve, and to engage the portion immediately surrounding said beads, whereby said sleeve will be constricted and said beads will be pressed forcibly against the surfaces of the members therewithin.

3. In a coupling for cylindrical metal members, the combination of a hard, ductile metal sleeve having a cylindrical interior and a tapered exterior and having adjacent to but spaced from its thin end a narrow internal circumferential bead adapted to receive snugly the member to be coupled, and a constricting member adapted to surround and engage the portion of said sleeve immediately surrounding said rib and adapted, when set up, to press said bead forcibly against the surface of the member to be coupled, said sleeve being also formed to engage the surface of the entering member at both sides of said bead whereby relative angular movement of said sleeve and member is prevented.

4. In a coupling for cylindrical metal members, the combination of a hard, ductile metal sleeve having a cylindrical interior and a doubly tapered exterior and having adjacent to but spaced apart from each of its ends a narrow internal circumferential bead, the internal diameters of said beads being substantially the same as the external diameters of the members to be coupled, constricting means adapted to surround the portions of said sleeve immediately surrounding said beads and adapted, when set up, to press said beads forcibly against the surfaces of the members to be coupled, said sleeve being also formed to engage the surfaces of said coupled members at the sides of said beads whereby angular movement of said members relative to said sleeve is prevented.

5. In a pipe coupling, the combination, with a pair of abutting cylindrical sections, of a ductile metal sleeve surrounding said sections and having a cylindrical interior and a doubly tapered exterior, the interior of said sleeve being formed adjacent to but spaced from each of its ends with a narrow internal bead closely receiving the ends of said sections, a pair of constricting members having their interiors tapered complementarily with the exterior of said sleeve and forming together a recess receiving said sleeve, and means for drawing said constricting members together whereby the diameter of said sleeve is uniformly reduced and said beads caused to press forcibly against the sections therewithin.

6. In a pipe coupling, the combination, with a pair of abutting cylindrical sections, of a ductile metal sleeve adapted to surround said sections and having a doubly tapered exterior, the interior of said sleeve being formed adjacent to each end with an internal bead adapted to receive one of said sections, and a pair of constrictng members having their interiors tapered complementarily with the exterior of said sleeve, the larger ends of said tapered interiors terminating in rounded shoulders outside of the diameters of said tapering portions, and means for drawing said constricting members together whereby the diameter of said sleeve may be reduced and said beads caused to press forcibly against the sections therewithin.

7. In a pipe coupling, in combination, a sleeve of hard malleable metal having a doubly tapered exterior and having adjacent to each end an interior bead displaced beyond the sleeve surface and adapted to receive snugly the sections to be coupled, a lining of comparatively soft malleable metal within said sleeve and confined between said beads, and a pair of constricting members having their interiors tapered complementarily with the exterior of said sleeve, and adapted, when applied to said sleeve and drawn together, to constrict the same about the sections upon which it is placed, pressing the said beads forcibly against the exteriors of said sections and causing said malleable lining to flow into the irregularities of the surfaces of said sections.

8. In a coupling for cylindrical metal members, the combination, with a hard metal member having a flaring recess adapted to receive one of said coupled members, of a sleeve of strong ductile metal adapted to fit closely about said coupled member, and having its exterior tapered in the same direction as said recess, an integral rib surrounding said sleeve adjacent to its forward end, said rib having a diameter intermediate the largest and smallest diameters of said recess, the interior of said sleeve being formed with a pair of spaced circumferential grooves, one at each side of said rib, and means whereby said sleeve may be drawn forcibly into said recess whereby said rib will be pressed down toward the exterior surface of said sleeve and the portion defined between said grooves will be displaced from the interior of said sleeve to form a bead which shall engage said coupled member.

9. In a coupling for cylindrical metal members, in combination, a sleeve of strong ductile metal adapted to fit closely about said coupled member, and having an integral external circumferential sleeve adjacent to its forward end, the interior of said sleeve being formed with a pair of spaced circumferential grooves, one at each side of said rib, and means for applying radial inward pressure upon said rib, whereby the same will be pressed down toward the exterior surface of said sleeve and the portion defined between said grooves will be displaced from the interior of said sleeve to form a bead which shall engage said coupled member.

10. In a coupling for cylindrical metal members, a sleeve adapted to surround and fit closely about such a member and having a tapered exterior surface and a circumferential rib intermediate the ends of said surface, a constricting member having a flaring exterior adapted to receive said sleeve and rib, the diameter of said rib being intermediate the greatest and least diameters of the flaring portion of said fitting and the interior of said fitting being formed with a pair of circumferential grooves, one at each side of said rib, and means for forcing said constricting member longitudinally past said sleeve, whereby said rib will be reduced exteriorly and the interior portion of said sleeve included between said grooves will be displaced inwardly and caused to press against the surface of the member therewithin.

11. In a coupling for cylindrical metal members, a sleeve adapted to surround and fit closely about such a member and having a tapered exterior surface and a cylindrical bore, the surface of said bore being circumferentially grooved to define a bead, a rib formed upon the exterior of said sleeve opposite said bead, a constricting member having a flaring exterior adapted to receive said sleeve and rib, the diameter of said rib being intermediate between the greatest and least diameters of the flaring portion of said fitting, and means for forcing said constricting member longitudinally past said sleeve, whereby said rib will be reduced exteriorly and said bead will be displaced inwardly and caused to press against the surface of the member therewithin.

12. In a coupling for cylindrical metal members, the combination, with a sleeve having a cylindrical surface adapted to fit closely against the cylindrical surface of such member and having an annular rib projecting from the surface opposite to said cylindrical surface, the cylindrical face of said sleeve being formed with a pair of circumferential grooves, one at each side of said rib, of means for exerting pressure upon said rib whereby the same may be depressed in the direction of the surface from which it projects, and the portion defined between said grooves may be displaced to one side of such cylindrical surface to form a bead which shall press against the surface of said coupled member.

13. In a coupling for cylindrical metal members, in combination, a sleeve having a cylindrical surface adapted to fit closely against the cylindrical surface of such member, such cylindrical surface being circumferentially grooved to define a bead, an integral rib carried by said sleeve opposite said bead, and means for exerting pressure upon said rib whereby the same may be depressed in the direction of the surface from which it projects and said bead may be pressed forcibly against the surface of said coupled member.

14. In a coupling for metal members, the combination, with a pair of tubular coupling members and means for adjustably connecting them, one of said coupling members being provided with a flaring entrance end, of a sleeve of hard ductile metal tapered forwardly to a comparatively thin edge and having a circumferential integral rib a short distance in the rear of said edge, the normal exterior diameter of said rib being intermediate the largest and smallest diameters of said entrance end and the interior of said sleeve being substantially cylindrical and formed with a pair of spaced circumferential grooves, one at each side of said rib, the other of said coupling members having a driving connection with said sleeve whereby, when the coupling members are drawn together, the rib will be depressed in the direction of the surface from which it projects and the portion of the sleeve interior between said grooves will be displaced to form a bead which shall press forcibly against the surface of said coupled member.

In testimony whereof, I hereunto affix my signature in the presence of two witnesses.

JOHN W. McFERRAN.

Witnesses:
 JOHN F. BLAKE,
 C. A. FISHER.